United States Patent [19]
Brougher

[11] 3,747,057
[45] July 17, 1973

[54] NAVIGATIONAL AID FOR RECEIVING SOUND SIGNALS

[76] Inventor: Jack L. Brougher, 19081 Dagmar Drive, Saratoga, Calif. 95070

[22] Filed: Nov. 10, 1971

[21] Appl. No.: 197,334

[52] U.S. Cl. .............................. 340/16 R, 340/3 C
[51] Int. Cl. ............................................. G01s 3/80
[58] Field of Search .................. 340/3 C, 6 R, 16 R

[56] References Cited
UNITED STATES PATENTS

| | | | |
|---|---|---|---|
| 3,626,365 | 12/1971 | Press et al. ..................... | 340/16 R X |
| 2,962,697 | 11/1960 | Rockwell ......................... | 340/6 R X |
| 2,769,160 | 10/1956 | Fryklund ............................ | 340/3 C |
| 3,430,233 | 2/1969 | Christensson ................ | 340/16 R X |
| 3,490,024 | 1/1970 | Sherrill et al. .................. | 340/6 R X |

Primary Examiner—Richard A. Farley
Attorney—Ben J. Chromy et al.

[57] ABSTRACT

A navigational aid for receiving sound signals such as those originating from people, buoys, boat or ship foghorns, etc., from any direction, and using them in aiding the navigation of a vehicle or craft especially when visibility is limited as by fog, rain, haze, smoke or during the nighttime. This device may also be used for search and rescue operations in locating lost people and animals. Still an additional use is in military operations to locate personnel/equipment during nighttime or obscured visibility conditions. Another use is the direction/vector location of aircraft in the air or on the ground during obscured visibility conditions. This device employs one or more sound receivers which convert the received sound signals into electrical signals. The electrical signals are supplied to a logic network to control indicating devices which indicate the direction from which the sound was received.

1 Claim, 4 Drawing Figures

INVENTOR.
JACK L. BROUGHER

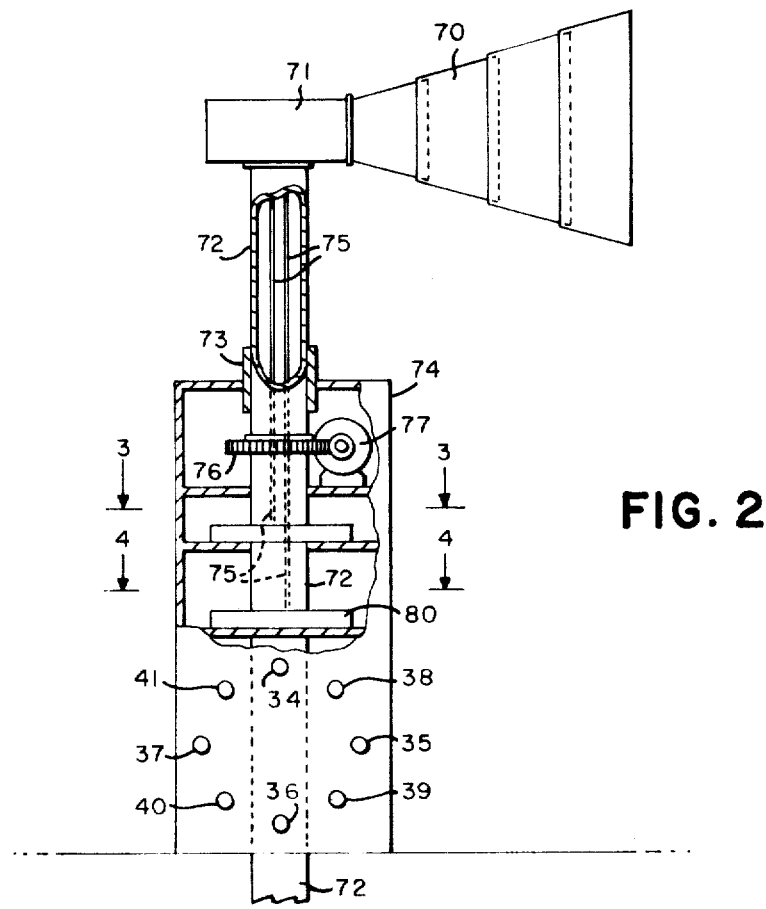
FIG. 2
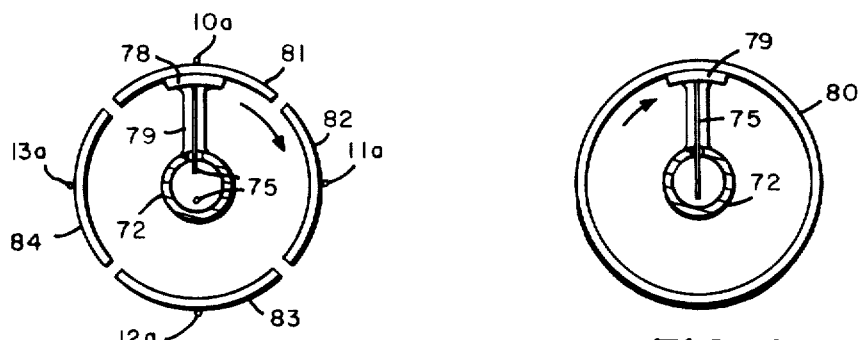
FIG. 3
FIG. 4
INVENTOR.
JACK L. BROUGHER
BY
ATTORNEYS

NAVIGATIONAL AID FOR RECEIVING SOUND SIGNALS

DESCRIPTION OF THE INVENTION

This invention relates to a navigational aid that is responsive to sound waves.

An object of this invention is to provide an improved navigational aid that is efficient and reliable in operation and which may be made so that it is compact and portable.

Another object of this invention is to provide an improved navigational aid employing one or more sound receivers for converting sound signals into electrical signals that control selected visual indicating devices which indicate the direction from which the sound signals were received.

Still another object of this invention is to provide an improved navigational aid receiving sound signals from different directions, said sound signals being converted into electrical signals that are supplied to a logic circuit for selectively controlling the energization of indicators which indicate the direction from which a sound signal was received.

Other and further objects of this invention will be apparent to those skilled in the art to which it relates from the following specification, claims and drawing.

In accordance with this invention there is provided a navigational aid that is responsive to sound signals for use in navigating a vehicle or craft during inclement weather conditions and during periods of obscured visibility. In this device the sound signals are received by suitable receivers which convert the sound signals into electrical signals that are supplied to a logic circuit for selectively controlling the energization of different indicators so that the direction from which the sound was received may be indicated to the operator of the vehicle or craft. By employing logic made of integrated circuit components this device may be made very rugged and compact so that it is readily portable. It can also contain its own power supply and be selective to other supplies. Also the integrated circuitry requires relatively low voltage current supply from which the drain is rather low. The circuitry will contain the necessary components for integration, compatibility, and operability within itself and outside itself to function as claimed. The operation of this device is simple and automatic once it is set up and turned on so that thereafter all the operator of the vehicle or craft is required to do is observe the indicating devices which indicate the different directions from which the sound signals are received. The only manual function would be in event no motor is used in the single rotating receiver operation.

Further details and features of this invention will be set forth in the following specification, claims and drawing, in which, briefly:

FIG. 2 is a view of an embodiment of this invention employing one sound receiver which is mounted on a rotatable support;

FIG. 3 is a sectional view taken along the line 3—3 of FIG. 2; and

FIG. 4 is a sectional view taken along the line 4—4 of FIG. 2.

Figure 1:
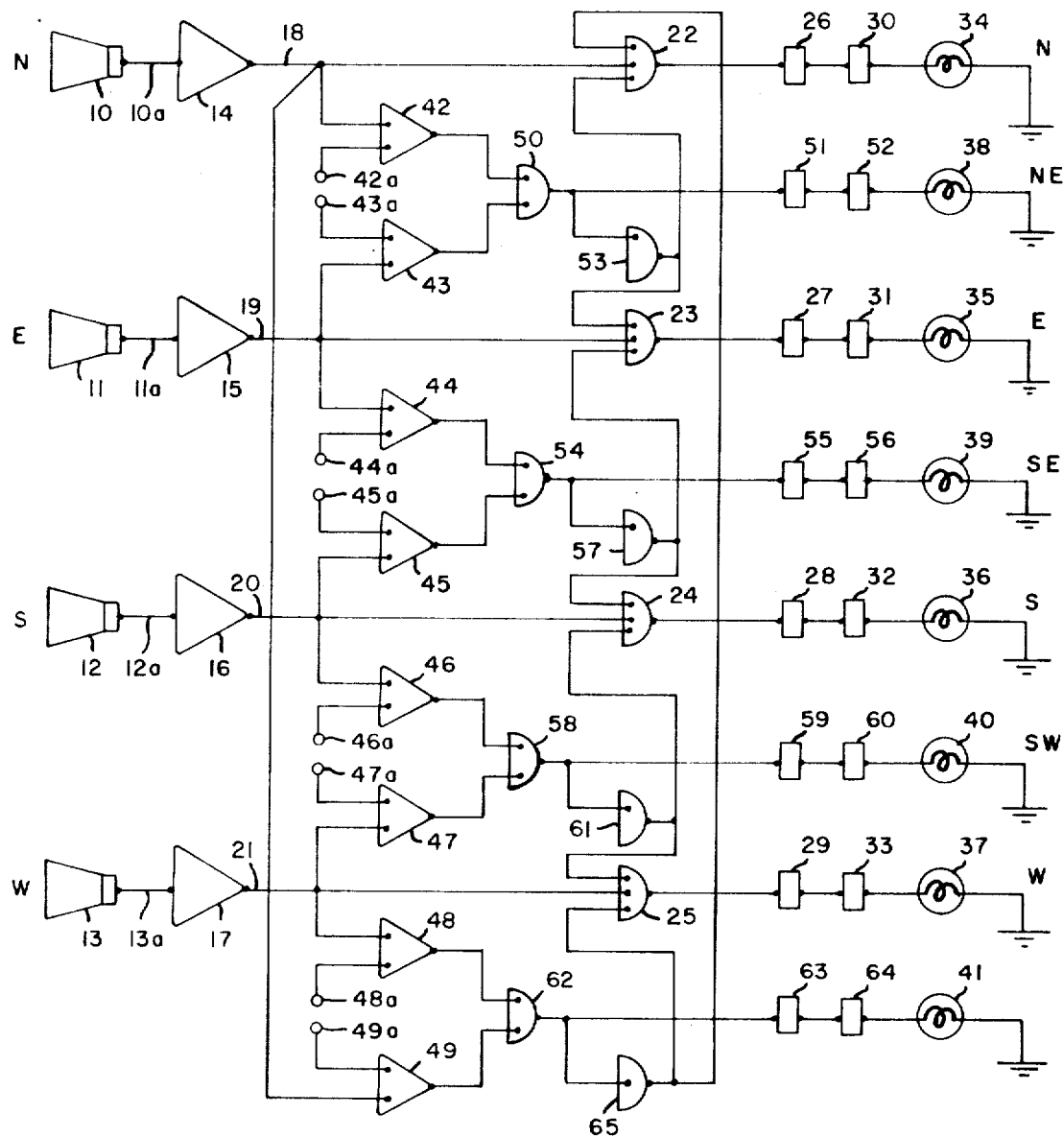
FIG. 1 is a representative logic schematic wiring diagram of an embodiment of this invention.

Referring to the drawing in detail reference numerals 10, 11, 12 and 13 designate directional sound receivers of conventional construction. In one embodiment of this invention these receivers are arranged in a circle so that different ones thereof occupy different quadrants of the circle whereby different ones of these receivers are capable of receiving sound from the different directions of the compass. Each of the directional receivers is provided with a transducer which may be electromagnetic, electrostatic or piezoelectric of conventional construction, for converting the sound energy received into an electrical signal. The transducers of receivers 10, 11, 12 and 13 are connected to the inputs of amplifiers 14, 15, 16 and 17, respectively, by lines 10a, 11a, 12a and 13a. The amplifier/detectors are of the Fairchild micrologic Model A741 or equivalent with necessary amplification and detection capability for the sound frequency ranges required.

The amplifiers 14, 15, 16 and 17 each include detectors so that rectified signals are supplied thereby to the output lines 18, 19, 20 and 21, respectively, leading to the gates 22, 23, 24 and 25, respectively. Gates 22, 23, 24 and 25 are integrated devices of the diode-transistor micrologic Model 946 manufactured by the Fairchild Camera and Instrument Corporation. Other equivalent gates may be used. These gates supply the rectified signal to the monostable miltivibrators 26, 27, 28 and 29, respectively, which are integrated devices of the diode transistor micrologic type 9941 manufactured by Fairchild. Other equivalent devices may of course be used. The multivibrators are employed as timers to time the energization of the current drivers 30, 31, 32 and 33, respectively, for intervals of 5 to 15 seconds, or as selected. These current drivers are integrated circuits such as the Model SH-2100 manufactured by Fairchild or equivalent. Drivers 30, 31, 32 and 33 control the energization of the lamp or meter indicators 34, 35, 36 and 37, respectively. These indicators are preferably arranged in a circle such as a compass card or rose so that these indicators are at the quarter points. Additional indicators 38, 39, 40 and 41 are provided to designate points between the quarter points.

The devices and connections 14 to 37 described above control the energization of selected ones of the indicators 34, 35, 36 and 37 when sound signals are received by the sound receivers 10, 11, 12 or 13. Thus, when individual ones of the sound receivers 10, 11, 12 and 13 receive sound signals, indicators 34, 35, 36 and 37, respectively, are energized. Additional indicators 38, 39, 40 and 41 are provided to be energized when selected pairs of the sound receivers are receiving sound signals. Thus, when the pairs of receivers 10–11, 11–12, 12–13 and 13–10 are receiving sound signals which are approaching the apparatus from a direction between these pairs of receivers, indicators 38, 39, 40 and 41, respectively, are energized. At the same time indicators 34, 35, 36 and 37 are prevented from being energized. This is accomplished through the operation of the following devices. Four pairs of dual comparators 42–43, 44–45, 46–47, and 48–49, which are integrated circuits Type 711 manufactured by Fairchild, or equivalent circuits, are provided to this apparatus. Comparators 42 and 43 are connected to the amplifier output lines 18 and 19, respectively, and compare the signals on these lines with reference voltages connected to the terminals 42a and 43a, respectively. The outputs of comparators 42 and 43 are supplied to the gate 50 if the input signals to these comparators are substantially equal and higher than the reference voltages. The output signal from the gate 50 is supplied to the monostable multivibrator 51 and to the current driver 52 so that the indicator 38 is energized. At the same time gate 50 supplies a signal to gate 53 and gate 53 supplies an inverted signal to inputs of gates 22 and 23 so that these gates prevent the signal supplied thereto over lines 18 and 19, respectively, from triggering the multivibrators 26 and 27, respectively, and energization of indicators 34 and 35 is inhibited.

Comparators 44 and 45 are provided between the lines 19 and 20 so that when both sound receivers 11 and 12 are receiving sound signals simultaneously these signals are compared by the comparators 44 and 45. Reference voltages for these comparators are supplied to terminals 44a and 45a, respectively, and if the signals supplied to comparators 44 and 45 exceed these reference voltages then signals are supplied to the gate 54 which in turn supplies a signal to the monostable multivibrator 55 and current driver 56 is activated so that the indicator 39 is energized. At the same time gate 57, the input of which is connected to the output of gate 54, is activated and it supplies an inverted signal to the gates 23 and 24 thereby inhibiting these gates from passing the signals from lines 19 and 20, respectively, to monostable multivibrators 27 and 28, respectively, so that energization of indicators 35 and 36 is also inhibited.

Comparators 46 and 47 are provided with the inputs thereof connected to lines 20 and 21, respectively, and when both sound receivers 12 and 13 are receiving sound signals these signals are compared by the devices 46 and 47 against reference voltages connected to the terminals 46a and 47a, respectively. Gate 58 supplies signals to the monostable multivibrator 59 which activates the current driver 60 and indicator 40 is energized. At the same time the gate 61 is activated and it supplies an inverted signal to gates 24 and 25 which function to inhibit the energization of indicators 36 and 37.

Comparators 48 and 49 are provided for the purpose of comparing the signals on lines 18 and 21 when both sound receivers 10 and 13 are receiving sound signals. Reference voltages for comparators 48 and 49 are supplied to terminals 48a and 49a, respectively. Signals on lines 18 and 21 are compared and if they exceed the reference voltage and are substantially equal then gate 62 is activated and supplies a signal to the monostable multivibrator 63 which activates the current driver 64 and indicator 41 is energized. At the same time the gate 65 is activated and supplies an inverted signal to gates 22 and 25 so that triggering of the monostable multivibrators 26 and 63 by signals appearing on lines 18 and 21 is inhibited. Gates 50, 53, 54, 57, 58, 61, 62 and 65 are also integrated circuits Fairchild Model 946 or equivalent. Monostable multivibrators 51, 55, 59 and 63 are the same as multivibrators 26–29 and current drivers 52, 56, 60 and 64 are the same as drivers 30–33. These drivers may be eliminated if light emitting diodes are substituted for the lamps 34 to 41, inclusive, since the light emitting diodes may be driven by the multivibrators directly.

In FIG. 2 there is shown an embodiment of this invention employing only one sound receiver which is rotatable. This sound receiver is provided with a collapsible horn 70 that is made of a plurality of telescoping sections which are of progressively increasing dimensions so that when the sections are extended they form a receiving horn. The small section is attached to the housing 71 which houses the transducer that converts the sound signals into electrical signals and which is of conventional construction. The housing 71 is attached to the hollow shaft 72 that is rotatably supported by the bearing 73. The bearing 73 is attached to the housing 74 and is supported thereby. The electrical conductors 75 which are connected to the transducer in the housing 71 are positioned in the hollow shaft 72 and they are rotatable therewith. The hollow shaft 72 is rotated by the reduction gearing 76 which is driven by the motor 77, or by hand as shown on the lower extension below housing 74.

The hollow shaft 72 extends down into the commutator and the brush 78 which is provided to the commutator is supported on the lower part of the hollow shaft 72 by the bracket 79 which is of insulating material. The brush 78 is connected to one of the conductors 75 leading to the transducer. The other conductor 75 is connected to the brush 79 that contacts the stationary slip ring 80 which is connected to ground. The stationary commutator is provided with four segments 81, 82, 83 and 84 and these segments are connected to the lines 10a, 11a, 12a and 13a leading to the inputs of amplifiers 14, 15, 16 and 17, respectively, as shown in FIG. 1. Thus, in employing the rotatable sound receiver shown in FIG. 2 the fixed sound receivers 10, 11, 12 and 13 shown in FIG. 1 are eliminated and only the single rotatable sound receiver shown in FIG. 2 is employed.

The logic circuit shown in FIG. 1 operates in the same manner when one rotatable sound receiver is employed as it does when four fixed sound receivers are employed. Thus, as the sound receiver 70 is rotated by the motor 77 or by hand on 72 the brush 78 is also rotated at the same speed. Brush 78, therefor, will be pointing in the same direction as the sound receiver 70 and contacts the commutator segment located in this direction. If a sound signal is received when the brush 78 contacts the commutator segment 81 then the indicator 34 is energized to indicate that a sound signal is being received from this direction. If the signal, on the other hand, is received when brush 78 is contacting both segments 81 and 82 then corresponding electrical signals are supplied to the inputs of comparators 42 and 43 and the indicator 38 will be energized to indicate that the sound signal is being received from this direction. Energization of indicators 34 and 35 is inhibited at this time as previously described.

While I have shown and described a preferred form of the invention, it will be understood that the invention is capable of variation and modification from the form shown so that the scope thereof should be limited only by the proper scope of the claims appended hereto.

I claim:

1. In sound receiving apparatus for use as a navigational aid on a craft or vehicle particularly under conditions of poor visibility, the combination of sound receiving means adapted to receive sound signals from different directions, means converting the sound signals to electrical signals, a first plurality of indicators positioned at the quarter points of a compass card corresponding to the directions indicated on the compass card from which said sound receiving means is adapted to receive signals, a second plurality of indicators, selected ones of said second indicators being positioned between selected ones of said first indicators so that said second indicators are positioned between the quarter points of said compass card, means connecting the outputs of said converting means to said first indicators so that when sound signals are being received from a direction corresponding to a quarter point of said compass card the corresponding one of said first indicators is energized, a plurality of signal comparators, said signal comparators being arranged in pairs, a plurality of gates, the outputs of each of said pairs of signal comparators being connected to a selected one of said gates, means connecting the outputs of said gates to selected ones of said second indicators, the inputs of said pairs of signal comparators being connected to the outputs of said converting means such that when signals of predetermined magnitudes corresponding to two directions are supplied to inputs of a predetermined pair of said signal comparators the corresponding one of said gates transmits a signal which controls the selected one of said second indicators, additional gates connected in said first mentioned connecting means to said first indicators, means connected to the outputs of said first mentioned gates for inhibiting selected ones of said additional gates when said selected second indicator is energized so that only said selected second indicator is energized.

* * * * *